United States Patent [19]

Sager et al.

[11] Patent Number: 4,881,165

[45] Date of Patent: Nov. 14, 1989

[54] METHOD AND APPARATUS FOR HIGH SPEED DATA TRANSMISSION BETWEEN TWO SYSTEMS OPERATING UNDER THE SAME CLOCK WITH UNKNOWN AND NON CONSTANT SKEW IN THE CLOCK BETWEEN THE TWO SYSTEMS

[75] Inventors: David J. Sager, Acton; Anne S. Valiton, Westboro, both of Mass.; Jay C. Stickney, Derry, N.H.; Raj K. Ramanujan, Leominster, Mass.

[73] Assignee: Digital Equipment Corporation, Maynard, Mass.

[21] Appl. No.: 176,474

[22] Filed: Apr. 1, 1988

[51] Int. Cl.⁴ .......................... G06F 15/00; H04L 7/00
[52] U.S. Cl. .................. 364/200; 364/222.2; 364/271.2; 364/271; 364/260.1; 375/106; 340/825.14; 340/825.20
[58] Field of Search ............... 364/200, 900 MS film; 375/106, 110, 111, 114; 340/825.20, 825.14

[56] References Cited

U.S. PATENT DOCUMENTS

| | | | |
|---|---|---|---|
| 4,430,745 | 2/1984 | Retts | 375/111 X |
| 4,642,791 | 2/1987 | Mallozzi et al. | 364/900 |
| 4,694,291 | 9/1987 | Denhez et al. | 340/825.2 |
| 4,694,294 | 9/1987 | Suzuki et al. | 340/825.14 |
| 4,771,441 | 9/1988 | Spengler et al. | 375/106 |
| 4,779,093 | 10/1988 | Watkins | 340/825.2 X |
| 4,782,499 | 11/1988 | Clendening | 375/113 |

Primary Examiner—Raulfe B. Zache
Assistant Examiner—Thomas C. Lee
Attorney, Agent, or Firm—Kenyon & Kenyon

[57] ABSTRACT

The invention is directed to a method by which data from a first synchronous subsystem is transmitted to a second synchronous subsystem physically spaced from the first subsystem such that the system clock is skewed relative to the two subsystems. Pursuant to the invention, the transmitted data cycle time is multiple of the common system cycle time and a clock signal is forwarded with the data from the first subsystem to the second subsystem. The clock signal forwarded with the data provides an indication to the second subsystem of the instants of time at which received data changes. The data change instants are used to generate a binary signal that inverts its value at each such instant. The binary signal is transmitted through a synchronizer to produce a logic signal in the second subsystem. The logic signal is utilized to transmit the received data into the second subsystem in synchronization with the clock of the second subsystem.

13 Claims, 7 Drawing Sheets

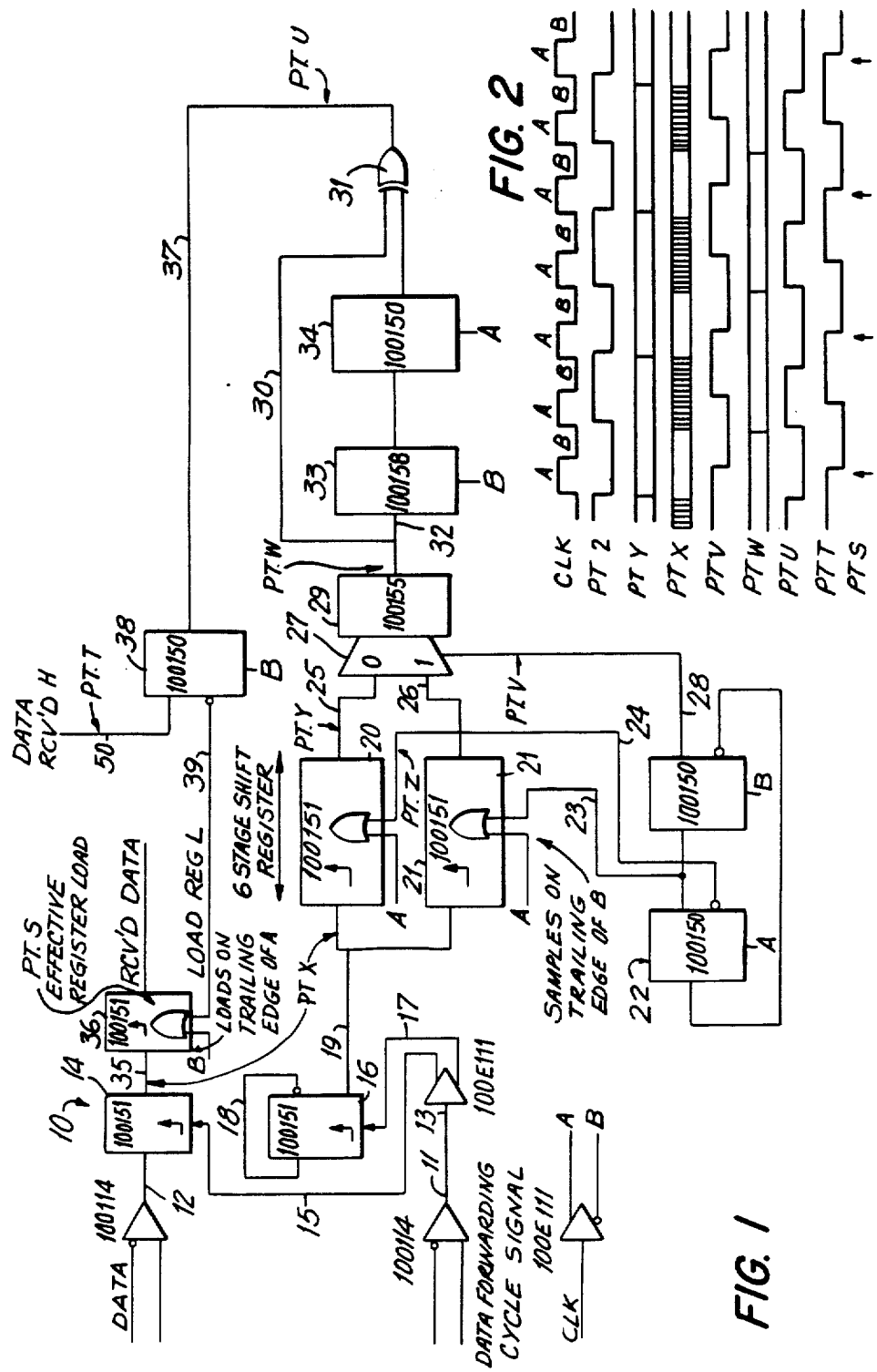

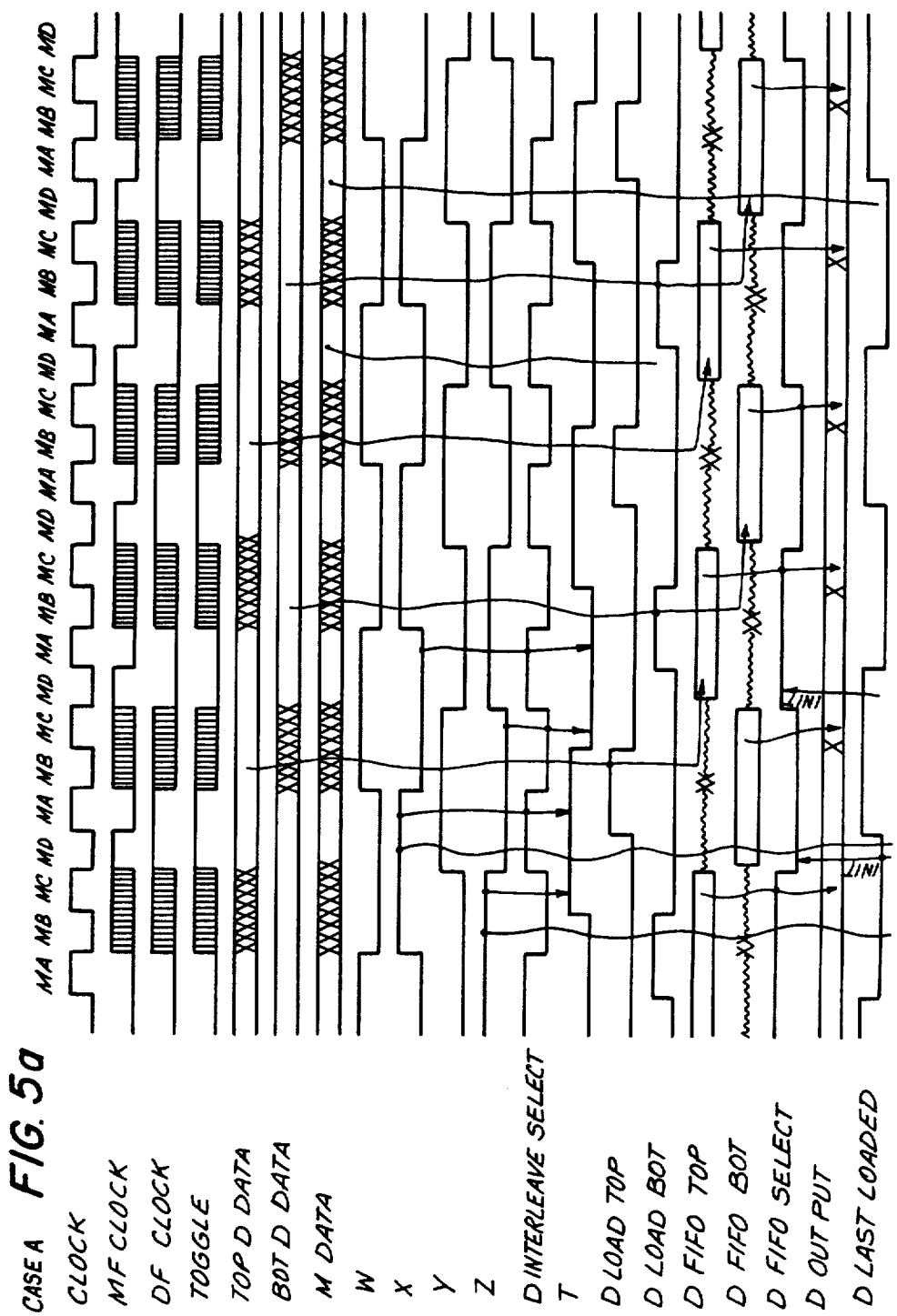

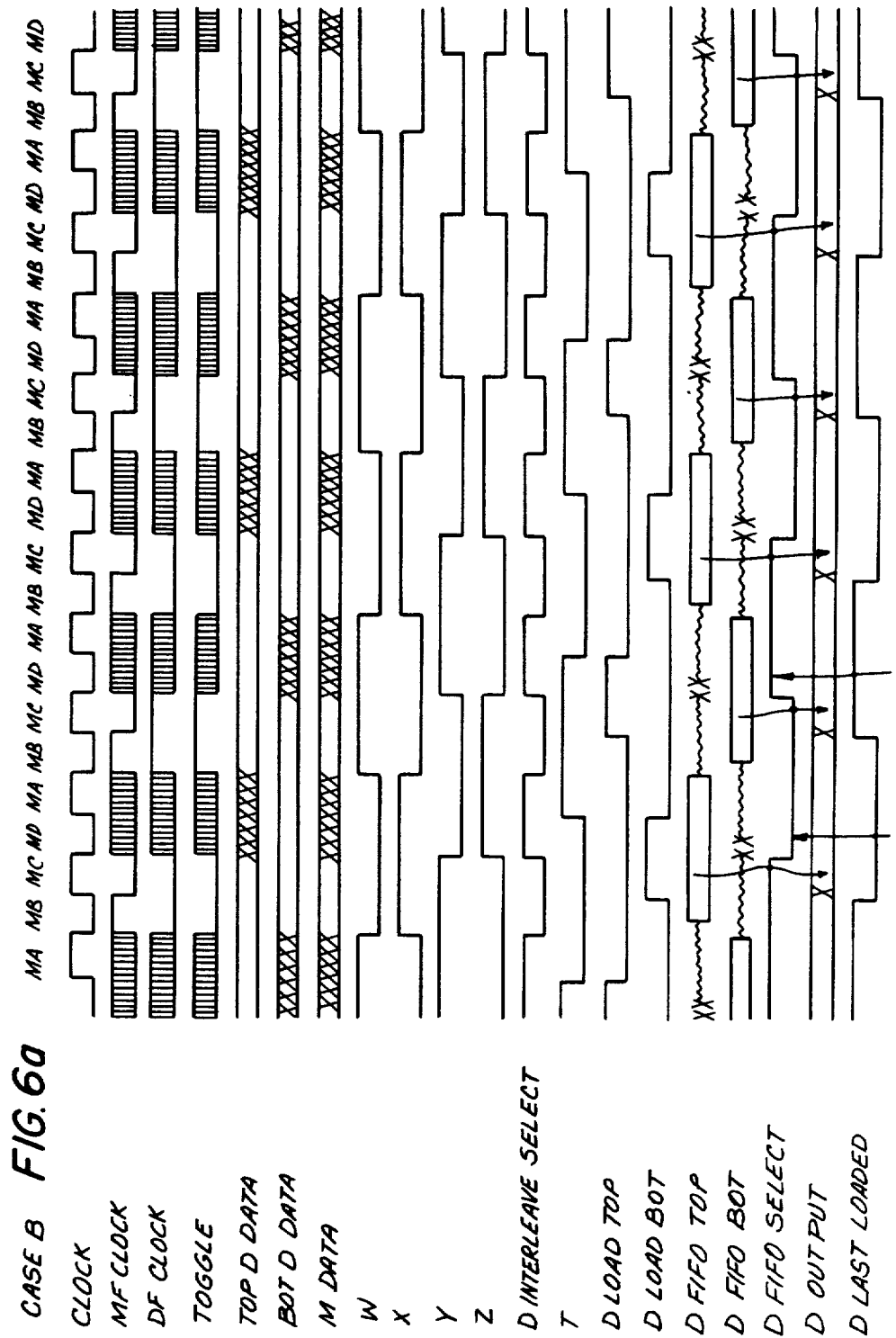

METHOD AND APPARATUS FOR HIGH SPEED DATA TRANSMISSION BETWEEN TWO SYSTEMS OPERATING UNDER THE SAME CLOCK WITH UNKNOWN AND NON CONSTANT SKEW IN THE CLOCK BETWEEN THE TWO SYSTEMS

FIELD OF THE INVENTION

The invention is directed to a digital computer system and, more particularly, to a high performance apparatus and method for transmitting data between systems operating with nearly the same clock frequency but with an unknown and non-constant clock phase difference.

BACKGROUND OF THE INVENTION

Most modern day computer systems require the transmission of data between physically spaced subsystems. In synchronous systems, all data processing must be performed in synchronization with clock cycles generated by a system clock. As computer systems are designed to operate at faster and faster speeds of operation, the clock cycle times have become very short in duration such that the time required to transmit data between subsystems plus clock skew throughout the computer system can be longer than the cycle time. Accordingly, data transmission between subsystems may be asynchronous relative to the clock cycles of the receiving subsystem.

It is, therefore, imperative to provide high performance data transmission devices to synchronize data received by a subsystem to the clock cycles of the receiving subsystem. One known method of transmitting data is the "asynchronous" method. Pursuant to this method, a clock signal is transmitted with data from one subsystem to another subsystem. The transmitted clock signal is input to a synchronizer arranged within the receiving subsystem to make the transmitted clock signal synchronous with the clock cycles operating within the receiving subsystem. The receiving subsystem must wait for the synchronizer to resolve a synchronous relationship between the transmitted clock and the clock cycle operation within the receiving subsystem and then uses the data. A problem with the asynchronous method is that the cycle time must be at least as long as the synchronizer resolving time. The reliability of synchronizers increases with increasing resolving time. Thus, high system clock frequencies cause short cycle times thereby limiting the resolving time and reducing the reliability of the synchronizer.

Another well known method of transmitting data between subsystems is to send a block of data together with a clock signal from the transmitting subsystem. The block of data is loaded into a buffer within the receiving subsystem by the transmitted clock. A signal is generated as the buffer begins to be loaded with the transmitted block of data. This signal is sent through a synchronizer. After the resolution of the signal to be synchronous with the receiving system clock, the receiving subsystem knows from the now synchronized signal that a block of data has been loaded into the buffer and begins to unload the buffer synchronously with its clock cycles.

The data block method permits high speed data transmission while allowing a long resolution time for synchronizing the signal which indicates the beginning of loading of the block of data into the buffer. However, the delay in the transmission path (i.e. the time from when the first data item of the block of data arrived at the buffer until the time such first data item can be processed in the receiving subsystem) includes the synchronizer resolving time. Accordingly, the delay time can be long if the resolving time is kept long to improve the reliability of the synchronizer.

SUMMARY OF THE INVENTION

It is a primary objective of the present invention to provide a high performance data transmitting method for transmitting data between two subsystems operating on nearly the same clock frequency, which subsystems are physically spaced apart and wherein there is an unknown and non-constant clock phase difference between the subsystems. Generally, the invention provides a data transmission cycle time which is a multiple of the common system clock cycle time, most typically 2 times.

The signal representing the data transmission time is forwarded with the data from the sending subsystem to the receiving subsystem.

In practical cases, although not essential to the method, the stable time of the data will first be increased at the receiving subsystem because it will have become short due to imperfections in the transport to the receiving system. This is done by capturing the data in synchronous flip-flops clocked with the forwarded timing signal or in parallel flip-flops or latches. Examples of both are described below.

The forwarded signal provides the receiving subsystem with an indication as to the instants of time when each individual data item is received in the receiving subsystem. These instants of time are used to generate a binary signal that inverts its value at each such instant of time. The binary signal is transmitted through a synchronizer to produce a logic signal in the receiving subsystem which is synchronous with the clock of the receiving subsystem.

It should be noted that the data does not change in the receiving system more frequently than every second cycle due to the multiple cycle time of the data transmission cycle time. Hence, each data item is stable at the normal state device clocking time in the receiving system for at least 1 cycle with a time margin on both sides. In fact, since it is possible, by the method of using parallel state devices used rotation (see co-pending application Ser. No. 176,570, filed on even date herewith, entitled, A METHOD AND APPARATUS FOR STABILIZED DATA TRANSMISSION now U.S. Pat. No. 4,811,364 which is hereby expressly incorporated by reference) to have as much stable time as we desire, the margin can be made as large as desired at the cost of parts and delay. Because of this cost, the system normally provides only as much margin as is required. The main issue now is to determine what cycle for each data item the particular data item can be synchronously received into the receiving subsystem. The above discussed logic signal is synchronous to the receiving subsystem and indicates which cycles of the receiving subsystem are in the vicinity of changes in the data. In other words, the synchronization of the binary signal provides a signal which is derived from the instants of time when each particular data item is received in the receiving subsystem and which is synchronized to the receiving subsystem clock. This signal is used to determine which cycles of the receiving subsystem clock should be used to capture received data items.

The synchronous logic signal is used to capture the received data items in a state device, coupled to the normal clock in the receiving subsystem during the right cycles. Thus, with each data transmission cycle, a data item enters the receiving subsystem in synchronization with the clock of the receiving subsystem.

The most important objective has now been met, that is to make the data usable in the receiving system with a minimum of delay. It is a property of the method, though that it is not predictable what cycle the data will be captured in nor even how many cycles may pass between data captures. In particular, if data transmission is at a rate of one data item per n cycles, it is not true that a data item will be captured every n cycles. This is apparent since we allow the relative phase of the clocks in the transmitting and receiving systems to drift. Even with no phase drift, this would happen. The receiving subsystem will, on average, capture a data item every n cycles but any particular interval may be more or less than n cycles.

As an additional feature to the invention, if the drift in phase of the clock between the transmitting and receiving subsystems can be bounded (as is always the case if the clocks come from the same oscillator), then a FIFO may be fitted to the system to provide received data at exactly even intervals of n cycles and at a cycle known at design time. The embodiment of FIG. 3 described below is designed for the case that the phase drift of the receiving subsystem clock relative to the transmitting subsystem clock is not more than ±1 system cycle time which is ½ of the data transmission period (but the initial phase difference is completely unknown).

For a better understanding of the above and other features and advantages of the invention, reference should be made to the following detailed description and to the accompanying drawings.

BRIEF DESCRIPTION OF THE DRAWINGS

FIG. 1 is a block diagram of a data receiving circuit pursuant to the invention.

FIG. 2 is a time diagram relating to the operation of the circuit of FIG. 1.

DETAILED DESCRIPTION

Figure 3:
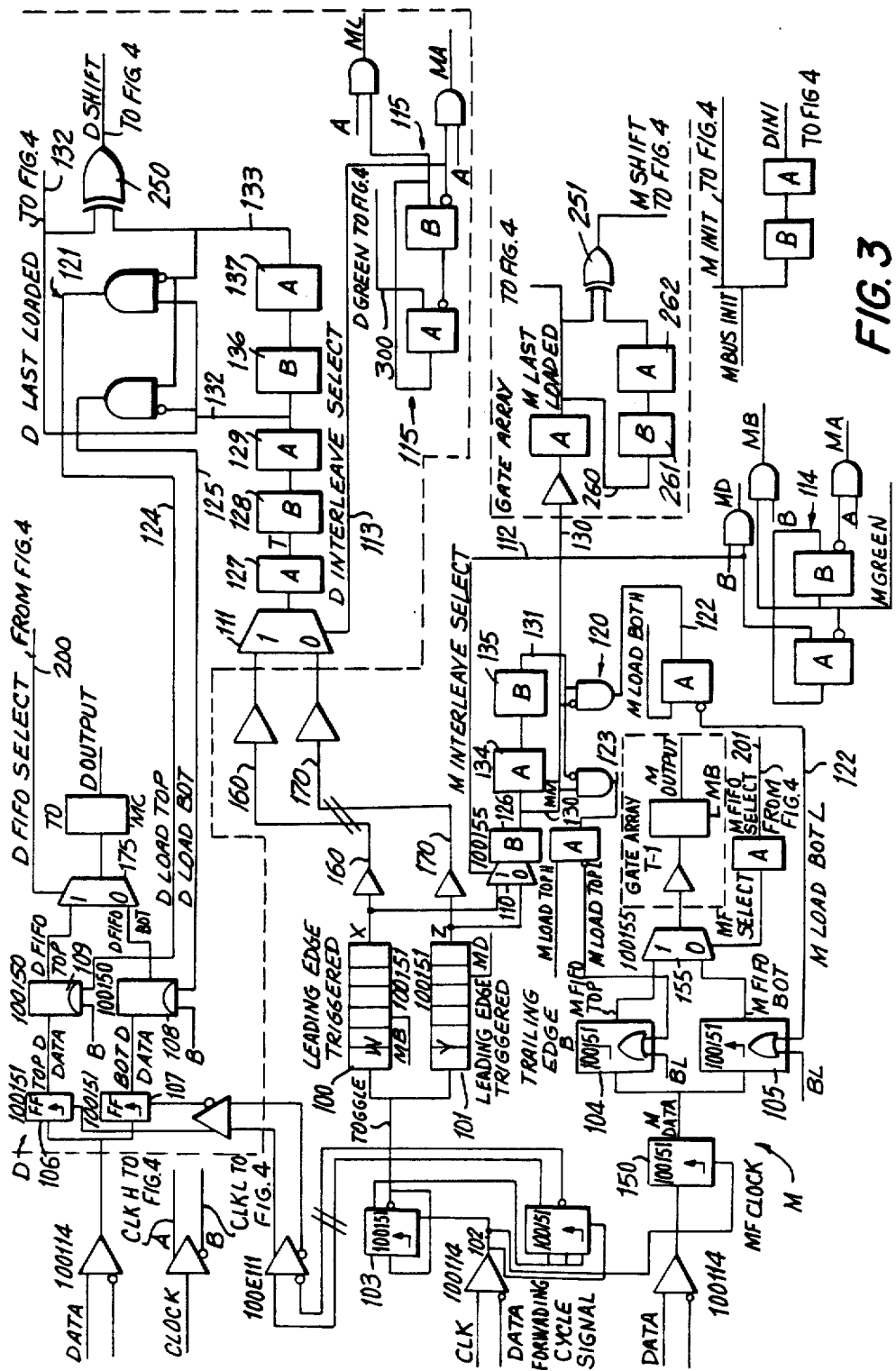
FIG. 3 is a block diagram of a data receiving circuit wherein data is received into more than one module.

Referring now to the drawings and initially to FIG. 1, there is illustrated a data receiving circuit in a receiving subsystem 10 of a computer system. A clock line 11 and data line 12 transmit a data forwarding cycle signal and a corresponding data item, respectively, from a transmitting subsystem (not illustrated) to the receiving subsystem 10 which is physically spaced from the transmitting subsystem. The data forwarding signal transmitted through line 11 has a period that is a multiple, in this example two, of the system clock period. It is assumed that the transmitting subsystem (not shown) produces a rising edge on the signal on line 11 which is nominally in the middle of the time that data is stable on line 12, and that this has not degraded to such an extent in the transport such that data is in fact stable on line 12 when a rising edge occurs on line 11. Each data item transmitted through the line 12 is received into a state device 14, in this case a synchronous flip-flop, the clock port of which is controlled by the forwarded data forwarding signal through line 15 such that each data item is captured by the state device 14 in synchronization with the data forwarding cycle signal. This serves to increase the data stable time back to the full data transmission period, or 2 times the system clock period, in case it had degraded in the transport. The forwarded data forwarding signal also controls the clock port of a state device 16 through a line 17.

As illustrated in FIG. 1, the state device 16 is arranged so that an inversion of its output is fed back as an input through a line 18, such that the output of the state device 16, appearing on line 19, is a binary signal which inverts with each data forwarding signal cycle. Thus, the inversion of the output on line 19 indicates that a new data item has been captured in the state device 14, specifically it changes at the same time data changes. The line 19 is inputted to each of two six stage shift registers 20, 21, arranged in parallel to one another and operating as pipelined synchronizers.

A divide by two circuit 22 is driven by the A and B phases of the system clock appearing within the subsystem 10. An output line 23 is coupled to the clock port of the pipelined synchronizer 21 and an inverted output line 24 is coupled to the clock port of the pipelined synchronizer 20. In this manner, successive samples of the signal appearing on input line 19 are interleaved to one and then the other of the pipelined synchronizers 20, 21.

The use of two parallel pipelined synchronizers is not essential to the system. They are used to increase the settling time for each stage, which otherwise would be half as long.

The outputs 25, 26 of the pipelined synchronizers 20, 21 are coupled to the inputs of a multiplexer 27, the select line 28 of which is coupled to another output of the divide by two circuit 22. The divide by two circuit will alternate in selecting the output of the pipelined synchronizers 20, 21 which will be synchronized to the subsystem A and B clock phases through operation of the divide by two circuit 22. Thereby the synchronized image of the single input line 19 is now reconstituted as a single line at the output of the multiplexer 27.

As illustrated in FIG. 1, the output of the multiplexer 27 is coupled directly into a latch 29 controlled by the A phase of the subsystem 10 clock. A first branch 30 of a parallel circuit couples the output of the latch 29 to one input of an exclusive OR gate 31. A second branch 32 of the parallel circuit transmits the output of the latch 29 through series coupled latches 33, 34, to produce a one cycle delay, to another input of the exclusive OR gate 31. The latch 33 is controlled by the B phase of the subsystem 10 clock and the latch 34 is controlled by the A phase of the subsystem 10 clock. The exclusive OR gate 31 continually compares the state at the present time, i.e. the signal on line 30, to the state of the signal 32 one cycle previously, i.e. after the one cycle delay of latches 33, 34. It thereby finds changes in the state of this signal.

A line 35 couples the output of the state device 14 to the input of a state device 36 for transmitting data from the state device 14 and into the subsystem 10. The state device 36 is loaded by the subsystem 10 clock at the end of an A phase, i.e. the leading edge of a B phase, only during cycles that are selected by a low state on "LOAD REG L" line 39, which line 39 is coupled to the output of the exclusive OR gate 31 via a line 37 and a latch 38. It is significant that the pipelined synchronizers 20, 21 sample on the trailing edge of the B phase of the subsystem 10 clock and the state device 36 samples on the trailing edge of the A phase of the subsystem 10 clock. The "DATA RCV'D" lines 50 informs the rest of the receiving subsystem 10 of cycles in which data has been captured. This design does not have the optional FIFO to provide output data exactly every other system cycle. If the FIFO is to be included, its first stage could replace device 36 or it could be coupled to device 36.

Referring now to FIG. 2, there is illustrated a timing diagram for the subsystem clock and related points PT S, PT T, PT U, PT V, PT W, PT X, PT Y and PT Z indicated with respect to the circuit of FIG. 1. Point PT X indicates changes in state of the state devices 14 and 16 which occur with some unknown delay relative to the A and B clock phases of the clock, as transmitted through the subsystem 10. The operation of the synchronizers 20, 21 by the divide by two circuit (PT Z) results in, a signal at the output of the synchronizers 20, 21 (PT Y) from which is derived a signal (PT T) to control the state device 36 to output a synchronized data item. The sampling times of device 36, PT S are in the center of the known data stable time at line 35, PT X.

The delay in the synchronizers 20, 21 may be essentially as long as deemed necessary for the reliability required with no change in operation. (The reliability of a synchronizer depends on details of the devices and the circuit and increases with the delay (effective resolving time) of the synchronizer). However, it will be seen that the delay should have a base value plus any multiple of the transmission period (the result being a multiple of the system clock period).

In the above described embodiment of the invention, the synchronizer delay is 12 machine cycle times which equals 6 times the transmitted data cycle time.

There are a number of alternative ways to implement the required synchronizer:

1. A shift register of the required length.
2. Several shift registers in parallel clocked at a submultiple of the machine cycle time and staggered in phase.
3. A ring buffer.

The above described embodiment implements two shift registers of 6 stages each, in parallel with one another, running interleaved, with each running at a shift rate half as fast as the machine cycle rate.

The synchronizer should be clocked at a time leading the usual register clocking time of the receiving machine. The optimal amount of lead is ½ (transmitted data period - synchronizer period). The synchronizer period would normally be the subsystem clock period but could be a multiple of this value. In any event it must not be larger than ½ of the transmitted data period. In the described embodiment, the synchronizer period is 1 machine cycle and the data period is 2 machine cycles. Hence the lead time is ½ (2−1=½ machine cycle. The synchronizers 20, 21 sample at the trailing edge of B phase which is ½ machine cycle before data register 36 which samples at the trailing edge of an A phase.

The signal on line 30 identifies cycles in the receiving machine during which the received data may be used. If the received data is used it is effectively loaded into a register 36 at the end of the cycle. Each data item will have one and only one cycle identified as the one in which it should be used. For this to work correctly the total delay in the path from the output of the state device 16 (PT X) to the final point of application of the signal that tells when the data item should be used, (i.e. the signal on line 39), should optimally be the lead time minus 1 machine cycle plus any multiple of the transmitted data period. Notice that this delay means that the signal is in phase with ordinary register clocking time in the receiving subsystem (the lead time of the synchronizer is canceled out). In this example, the delay from line 19 to line 39 is 11¼ system cycles which is leadtime (¼ cycle) minus 1 plus 6 times the transmission period (2 cycle). Observe that adding a delay equal to the transmission period to the path from line 19 to line 39 does not change the signal at line 39.

It must also be noted that FIG. 2 is useful for seeing how the system works, but in operation the waveform at PT T, for example, will not always look as shown in FIG. 2. We have no control over the time at which data arrives at PT X. Data may be arriving anytime shown as hatched in PT X in FIG. 2. In particular, data may be arriving at the right most extreme of the hatched areas, for example. If there is then an infinitesimal change in the data arrival time to later, for example, an event which should be expected, then the synchronizer will resolve the change on line 19 to a later cycle. One of the changes at PT W will be 1 system cycle later, hence an assertion at PT V will be a cycle later and hence device 36 will one time be loaded a cycle later. The result of this would be that somewhere PT T would be unasserted for 2 cycles between assertions in contrast to the perfectly uniform pattern shown in FIG. 2. The interval between item data captures would one time be 3 system cycles instead of the usual 2. This would likely be followed sometime later with the opposite anomaly wherein data would one time be captured in successive system cycles evidenced by PT T being asserted in 2 succeeding cycles.

Various arrangements can be used to accomplish loading data into a register in the correct machine cycle. One example is to delay the signal by a machine cycle with latches or a register and compare the undelayed and delayed versions, for example with an exclusive OR gate as is done with the parallel circuit branches 30, 32 and the exclusive OR gate 31. If the exclusive OR gate output is 1 during a machine cycle, the data should be used during that cycle.

Referring now to FIG. 3, there is illustrated a further embodiment of the invention. More specifically, the embodiment of FIG. 3 is used when the transmitted data items are to be used in more than one module of a subsystem, or more generally, when there is significant clock skew within a receiving subsystem. The system of FIG. 3 is similar to the embodiment of FIG. 1 including parallel, interleaved synchronizers 100, 101 to synchronize a binary signal which is derived from the forwarded data forwarding cycle on line 102 via control of a state device 103. The significant difference is the reception of data at several locations D and M, which may be on different modules.

Moreover, the incoming data is interleaved between two state devices 106, 107 at, for example, the D location to increase the data stabilization time and thereby assure capturing the data even if there is considerable clock skew from the M module to the D module. Notice that at location M data is initially caught in a flip-flop 150 to extend its valid time, exactly as in FIG. 1. On the other hand, at location D, data is caught in two parallel, alternately loaded flip-flops 106, 107 for twice as much stable time which is needed because there is large skew between the clock to devices 107, 108 and the clocks to the synchronizer 100, 101. For a more detailed description of the operation of interleaved reception of data items to increase the period of data stabilization, reference should be made to co-pending application Ser. No. 176,570, filed on even date herewith, entitled A METHOD AND APPARATUS FOR STABILIZED DATA TRANSMISSION now U.S. Pat. No. 4,811,364 which is hereby expressly incorporated by reference.

Because of the high speed of the system, it is impossible to get the synchronizer 100, 101 output to the M location by conventional means. This transfer was therefore done as an interleaved transfer using two physical lines 160, 170. This is particularly convenient since the synchronizer 100, 101 is interleaved so there is already interleaved signals separated for transmission. The multiplexer 111 and state device 127 receive the interleaved transmission according to the above-identified co-pending application.

For the embodiment of FIG. 3 it is assumed that the phase drift between the sending subsystem (not shown) and the receiving subsystem is bounded to be less than ± one system cycle. It is therefore possible to use a FIFO with this design to provide data output exactly every other system cycle with no anomalies, unlike the case of FIG. 1. Such FIFO's, 104, 105; 108, 109 are provided. State devices 104 and 105 together with multiplexer 155 and the logic controlling its steering constitute a 2 location FIFO implemented as a two-device ring buffer for the data received at location M. Similarly state devices 108 and 109 and the multiplexer 175 and its steering logic form a FIFO for data received at location D. It is also a 2 device ring buffer. It can be seen that data is supplied from the D location perfectly regularly at every clock MC phase. At the M location, data is supplied at every MB phase. Each of these phases happens once every 2 system clock cycles, or once every transmission cycle.

The FIFO devices 104, 105, 108, 109 are triggered by signals derived from the synchronized binary signals outputted from the multiplexers 110, 111, coupled to the parallel synchronizers 100, 101, and resident on the M module and D module, respectively The signals on the select lines 112, 113 of the multiplexers 110, 111 are derived from divide by two circuits 114, 115 resident on and operating off the clock present in each module location M and D, respectively. Note that they must be identically initialized. These circuits are also the ones that define the MA, MB, MC, MD phases from the subsystem clocks A, B.

Figure 4:
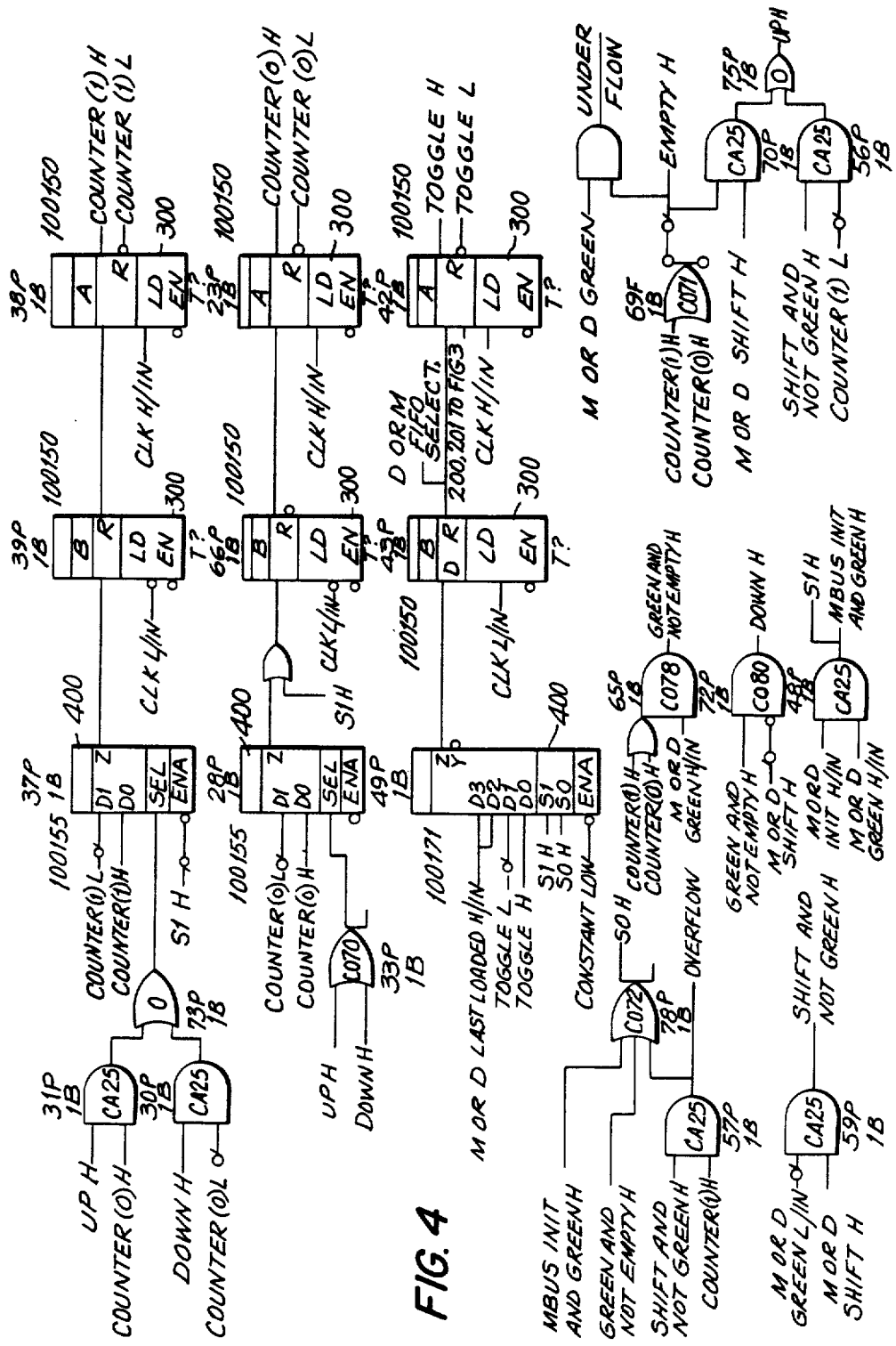
FIG. 4 illustrates the components operating to provide FIFO select lines to the circuit of FIG. 3.

Proper operation is achieved if D FIFO SELECT 200 and M FIFO SELECT 201 are simple signals that alternate every transmission cycle (every other system cycle) provided they were properly initialized. FIG. 4 illustrates the logic circuits used to generate the D FIFO SELECT 200 and M FIFO SELECT 201 signals. The additional function of the logic of FIG. 4 is to detect and recover from errors. If the transport environment from the transmitting system to the receiving system has noise, it may happen that a clock pulse is received at line 102 due to noise when there should not have been a pulse. It may alternatively happen through transmission imperfections that a pulse that should appear at point 102 does not. Such erroneous occurrences appear to be effectively high phase drift The FIFOs work correctly only if phase drift is bounded, as was assumed.

These errors may then cause FIFO overflow or underflow. The logic detects and reports this. In addition the logic is arranged to insure that subsequent operation will be correct. With simpler logic correct operation may never resume after such an error The output of the multiplexers 110, 111 are input to parallel AND gate configurations 120, 121, respectively, to provide triggering signals for each of the top and bottom FIFO device 104, 105; 108, 109 via output lines 122, 123; 124, 125, respectively. As in the embodiment of FIG. 1, the output of each multiplexer 110, 111 is input to latches 126; and 127, 128, 129, respectively, which are each coupled to the AND gates 120, 121, respectively, by a parallel circuit, including a first branch 130, 132, respectively, directly coupling the output of the latch 126, 129, respectively, to one of the inputs of each AND gate of the AND gate arrangements 120, 121 and a second branch 131, 133, each including latches 134, 135; 136, 137, respectively, coupled in series between the latch 126, 129, respectively, and the other of the inputs of each AND gate of the AND gate arrangements 120, 121.

The logic circuit illustrated in FIG. 4 is provided for each of the M and D locations to generate the D FIFO SELECT and M FIFO SELECT signals on lines 200, 201, respectively. The inputs of exclusive OR gates 250, 251 (see FIG. 3) are coupled to D and M last data item load indications, i.e. the signals on lines 132, 130, respectively, and one cycle delay last data item load indications, i.e. the signals on line 133 and the signal on line 260, which is past through series connected latches 261, 262, respectively, to provide D SHIFT and M SHIFT input signals to the logic circuit of FIG. 4, indicated as M or D SHIFT inputs in FIG. 4. Moreover, D Green and M Green, inputs indicated in FIG. 4, are additional output lines 300, 301, respectively, from the divide by two circuits 115, 114, of FIG. 3. In addition, the M INIT, D INIT, D LAST LOADED (line 132) and M LAST LOADED (line 130) signals (FIG. 3) are coupled to the like identified lines of FIG. 4. The components of the logic circuit generally comprise an array of multiplexers 400 and latches 330 with inputs from FIG. 3, as described below.

Note that MBUS INIT (FIG. 3) must be asserted to initialize the system for several cycles after the divide by two circuits 114 and 115 have been initialized during the time that CLK is being received in normal fashion. NBUS INIT is supplied by the subsystem on start up to initialize the circuit of FIG. 3

Figure 5B:
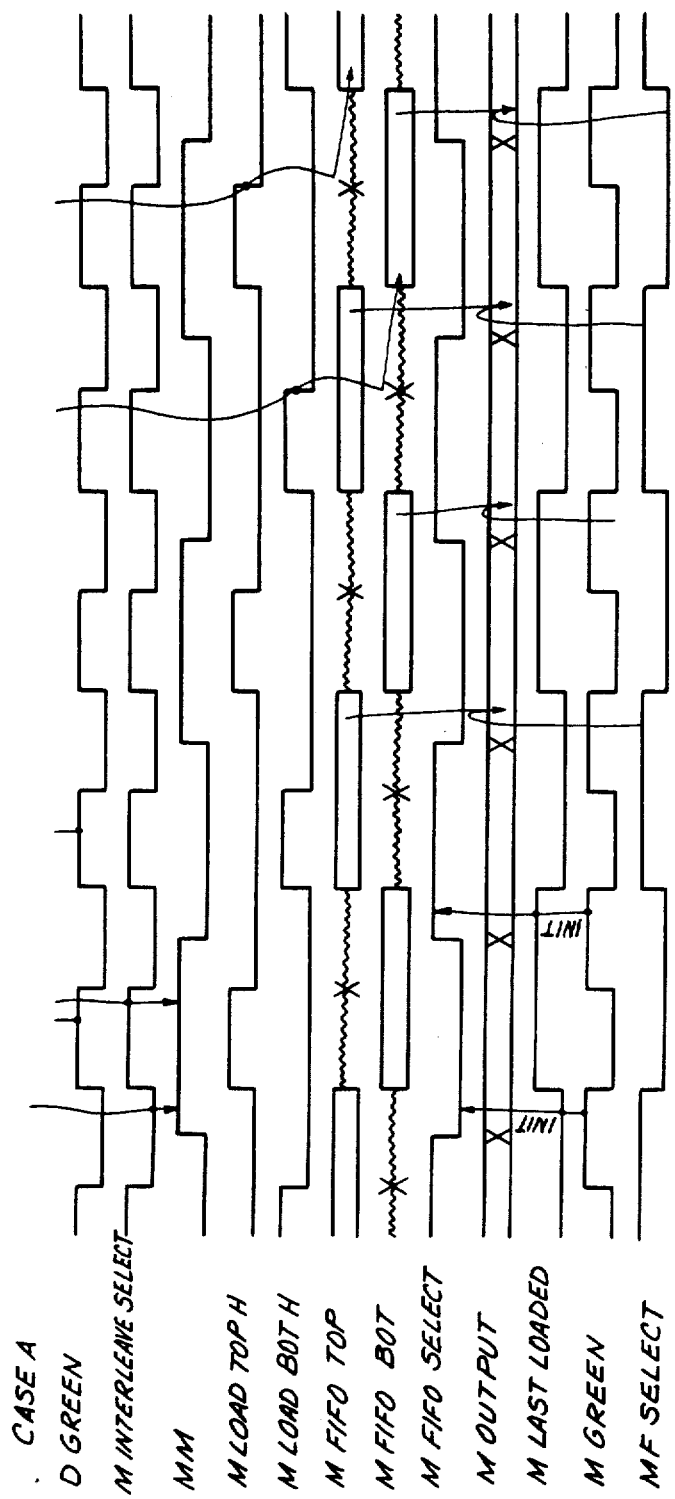
FIGS. 5a & b, taken together, illustrate a time diagram of one of two cases of operation of the circuit of FIG. 3.
Figure 6B:
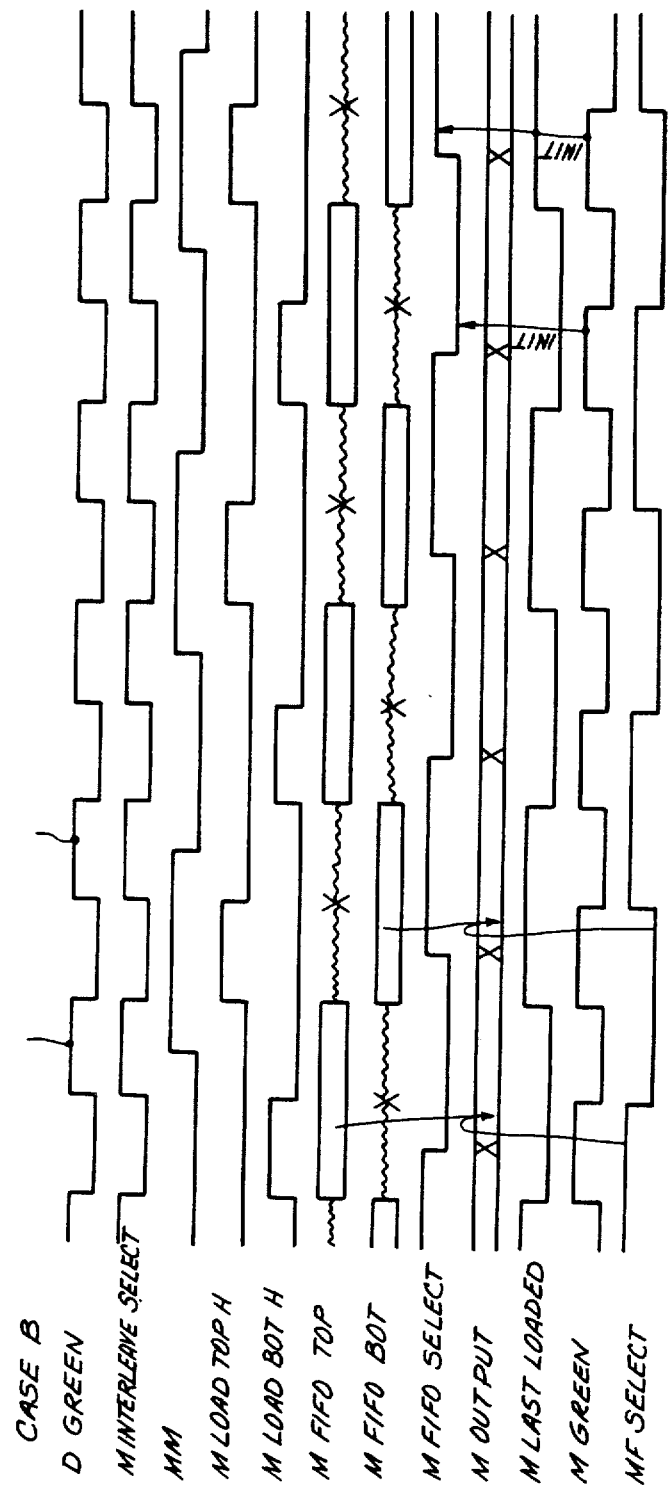
FIGS. 6a & b, taken together, illustrate a time diagram for the other of the two cases of operation of the circuit of FIG. 3.

Referring to FIGS. 5a, b, and 6a, b, there is illustrated timing signals for two possible cases of operation as they are derived from the subsystem clock and the binary signal produced by the data forwarding signal on line 102. Case A of FIGS. 5a, b illustrates delays in the data forwarding signal, as represented at the M and D locations (MF CLOCK and DF CLOCK) when the delays occur during B and C phases of the subsystem (A CLOCK). Case B of FIGS. 6a, b illustrates delays for the MF and DF clocks which occur during D and A cycles of the subsystem clock. The two cases A and B cover all of the relative extremes of delay between the data forwarding signal and the subsystem clock. Whichever case prevails, as illustrated in the figures, the FIFO control and multiplexer select line signals provide a synchronized reception of the data items at each of locations M and D.

The diagrams show example initialization. As was described earlier with respect to FIG. 1, these timing diagrams cannot show everything that will happen in practice. MF clock may arrive anytime during the hatched area, for example at the latest extreme of the hatched area, an infinitesimal further late shift should be expected. If this happens in CASE A, the situation has effectively shifted to CASE B. So the perfectly regular waveforms in both CASE A and CASE B should be viewed as being broken by occasional random jumps from CASE A to CASE B and back again. In this case though if you stay within the rules that the phase does not drift more than ±1 cycle (2 phases) then the FIFO outputs should remain perfectly regular.

What is claimed is:

1. A method of continuously transmitting a series of data items from a first system to a second system, each of said first and second systems being coupled to a clock signal having a cycle time wherein there is non-constant and unknown skew in the clock signal between the first and second systems, comprising the steps of:
   (a) transmitting the series of data items serially from the first system to the second system as a function of the clock signal in the first system;
   (b) transmitting a data forwarding signal from the first system to the second system;
   (c) capturing each one of the series of data items in a first state device in the second system as a function of the data forwarding signal;
   (d) utilizing the data forwarding signal received by the second system to indicate an instant of time when each one of the series of data items is received, by generating a binary signal which inverts at each such instant of time;
   (e) synchronizing the binary signal to the clock signal of the second system; and
   (f) loading each one of the series of data items from the first state device into a second state device in the second system as a function of the clock signal in the second system and the synchronized binary signal, such that the synchronized binary signal determines which one of the cycles of the clock signal of the second system should be used to capture each one of the series of data items.

2. The method according to claim 1 wherein the binary signal is synchronized with the clock signal in the second system by a synchronizer.

3. The method according to claim 2 wherein the clock signal has a first phase and a second phase, each of the phases has a leading an trailing edge, further comprising the steps of:
   (a) loading each one of the series of data items into the second state device in the second system on the trailing edge of the first phase; and
   (b) operating the synchronizer to sample the binary signal on the trailing edge of the second phase.

4. The method according to claim 2 wherein the synchronizer operates pursuant to a synchronizer delay period equal to a multiple of the cycle time of the clock signal.

5. The method according to claim 1 wherein the second state device is a first stage of a FIFO allowing one of the series of data items to be received every other cycle time.

6. A digital system which comprises:
   (a) a first system;
   (b) a second system;
   (c) a data transmission line coupling the first system to the second system;
   (d) a data forwarding signal line coupling the first system to the second system;
   (e) a clock signal having a cycle time, coupled to the first system and the second system wherein there is a nonconstant and unknown skew in the clock signal between the first and second systems;
   (f) the first system operating to continuously transmit a series of data items across the data transmission line to the second system as a function of the clock signal in the first system;
   (g) the first system operating to transmit a data forwarding signal across the data forwarding signal line to the second system;
   (h) a first state device in the second system coupled to the data transmission line, the data forwarding signal operating to enable the first state device to capture each one of the series of data items;
   (i) a second state device in the second system coupled to the data forwarding signal line, the data forwarding signal operating to enable the second state device to generate a binary signal which inverts to indicate an instant of time when each one of the series of data items is received in the first state device;
   (j) the second state device being coupled to a synchronizer, the synchronizer operating to synchronize the binary signal to the clock signal of the second system;
   (k) a third state device being coupled to the first state device and the synchronizer;
   (l) the clock signal of the second system and the synchronized binary signal operating to enable the third state device to capture each one of the series of data items from the first state device such that the synchronized binary signal determines which one of the cycles of the clock signal of the second system should be used to capture each one of the series of data items.

7. The digital system of claim 6 wherein the clock signal comprises a first phase and a second phase, each of the phases has a leading and trailing edge, further comprising:
   (a) the trailing edge of the first phase operating to enable the third state device to capture each one of the series of data items; and
   (b) the trailing edge of the second phase operating to enable the synchronizer to sample the binary signal.

8. The digital system of claim 6 wherein the synchronizer operates pursuant to a synchronizer delay period equal to a multiple of the cycle time of the clock signal.

9. The digital system of claim 6 having a transmitted data period and wherein a total delay in a path from an output of the second state device in the second system to the coupling of the synchronized binary signal to the third state device of the second system is equal to:

$$(\text{transmitted data period} - \text{synchronizer delay period}) - \text{one clock signal cycle time} + \text{any multiple of the transmitted data period}.$$

10. The digital system of claim 6 wherein the third state device is a first stage of a FIFO operated to allow one of the series of data items to be received every other cycle time.

11. The digital system of claim 6 wherein the synchronizer comprises a shift register of a preselected length.

12. The digital system of claim 6 wherein the synchronizer comprises a plurality of shift registers in parallel clocked at a submultiple of the cycle time of the clock signal and staggered in phase.

13. The digital system of claim 6 wherein the synchronizer comprises a ring buffer.

* * * * *